(12) United States Patent
Nishide (10) Patent No.: US 10,496,022 B2
(45) Date of Patent: Dec. 3, 2019

(54) NATURAL FREQUENCY MEASURING DEVICE AND IMAGE FORMING APPARATUS

(71) Applicant: FUJI XEROX CO., LTD., Tokyo (JP)

(72) Inventor: Shuichi Nishide, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 5 days.

(21) Appl. No.: 15/687,739

(22) Filed: Aug. 28, 2017

(65) Prior Publication Data

US 2018/0113408 A1    Apr. 26, 2018

(30) Foreign Application Priority Data

Oct. 20, 2016 (JP) ................................ 2016-206216

(51) Int. Cl.
*G03G 15/00* (2006.01)
*H04N 1/00* (2006.01)
*H04N 1/40* (2006.01)
*G03G 15/01* (2006.01)

(52) U.S. Cl.
CPC ..... *G03G 15/5062* (2013.01); *G03G 15/0131* (2013.01); *G03G 15/55* (2013.01); *H04N 1/00978* (2013.01); *H04N 1/40037* (2013.01); *G03G 2215/00637* (2013.01); *G03G 2215/0158* (2013.01); *H04N 2201/0082* (2013.01)

(58) Field of Classification Search
CPC ........... G03G 15/5062; G03G 15/0131; G03G 15/55; H04N 1/00978; H04N 1/40037
See application file for complete search history.

(56) References Cited

U.S. PATENT DOCUMENTS 6,925,279 B2 *  8/2005  Kamoshita ......... G03G 15/0131
                                                                399/162

FOREIGN PATENT DOCUMENTS

JP    2006-195129 A    7/2006

* cited by examiner

*Primary Examiner* — David M. Gray
*Assistant Examiner* — Michael A Harrison
(74) *Attorney, Agent, or Firm* — Sughrue Mion, PLLC (57) ABSTRACT

A natural frequency measuring device includes a receiving unit and a measuring unit. The receiving unit receives information of an image formed on a recording medium with vibrations of different frequencies provided to a member used to form the image. The measuring unit measures a natural frequency of the member from a frequency response characteristic using a misregistration amount of the image represented by the information of the image received by the receiving unit.

6 Claims, 7 Drawing Sheets

NATURAL FREQUENCY MEASURING DEVICE AND IMAGE FORMING APPARATUS

CROSS-REFERENCE TO RELATED APPLICATIONS

This application is based on and claims priority under 35 USC 119 from Japanese Patent Application No. 2016-206216 filed Oct. 20, 2016.

BACKGROUND

The present invention relates to a natural frequency measuring device and an image forming apparatus.

SUMMARY

According to an aspect of the invention, there is provided a natural frequency measuring device including a receiving unit and a measuring unit. The receiving unit receives information of an image formed on a recording medium with vibrations of different frequencies provided to a member used to form the image. The measuring unit measures a natural frequency of the member from a frequency response characteristic using a misregistration amount of the image represented by the information of the image received by the receiving unit.

BRIEF DESCRIPTION OF THE DRAWINGS

An exemplary embodiment of the present invention will be described in detail based on the following figures, wherein.

DETAILED DESCRIPTION

An embodiment example for implementing a disclosed technique will be described in detail below with reference to the drawings. Component elements or processes having the same operation or function are assigned with the same reference numeral throughout all drawings, and redundant description thereof will be omitted.

A schematic configuration of an image forming apparatus 10 according to the disclosed technique will first be described with reference to FIG. 1.

Figure 1:
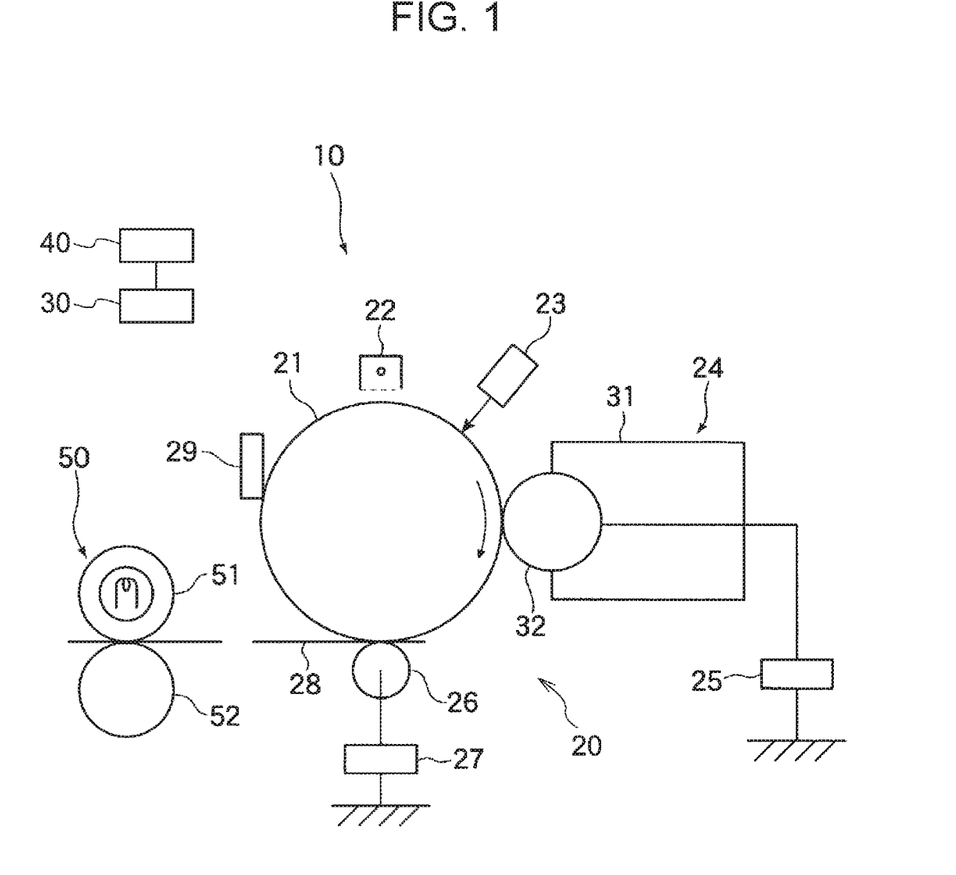
FIG. 1 is a diagram illustrating a schematic configuration example of an image forming apparatus.

As illustrated in FIG. 1, the image forming apparatus 10 includes a photoconductor 21 that is subjected to charging and subsequent irradiation with light to form an electrostatic latent image on a surface thereof. The photoconductor 21 is surrounded by a charging device 22 that charges the surface of the photoconductor 21, a writing head 23 that irradiates the photoconductor 21 with light to form the electrostatic latent image on the surface of the photoconductor 21, and a developing device 24 that causes toner to adhere to the electrostatic latent image formed on the photoconductor 21 to develop the electrostatic latent image. The image forming apparatus 10 further includes a transfer roller 26 at a position facing the photoconductor 21 to apply an electric field between the transfer roller 26 and the photoconductor 21 with a recording medium 28 nipped therebetween to transfer the toner image formed on the surface of the photoconductor 21 onto the recording medium 28. The image forming apparatus 10 further includes a cleaning device 29 that removes toner remaining on the photoconductor 21 after the transfer of the toner image.

Further, the recording medium 28 is supplied from the upstream side of a part in which the photoconductor 21 and the transfer roller 26 face each other (a nip part). On the downstream side of the nip portion, a fixing device 50 is provided which heats and presses the toner image transferred to the recording medium 28 to fix the toner image on the recording medium 28.

Herein, the photoconductor 21 includes a metal drum that rotates in the direction of a corresponding arrow and has a surface formed with a photoconductor layer containing a material such as an organic photoconductive material, an amorphous selenium-based photoconductive material, or an amorphous silicon-based photoconductive material. Further, the charging device 22 uses a scorotron that causes corona discharge, for example.

In the image forming apparatus 10, the writing head 23 includes a light emitting diode (LED) print head (an LED array) having LEDs, the number of which corresponds to the maximum pixel number in the width direction of the image (the axial direction of the photoconductor 21). The writing head 23 generates exposure light that flashes based on an image signal, to thereby form the electrostatic latent image on the surface of the photoconductor 21. The electrostatic latent image refers to a potential image produced by the difference in surface potential between portions of the photoconductor 21 not irradiated with the light and portions of the photoconductor 21 irradiated with the light and reduced in surface potential, for example.

Further, the developing device 24 stores in a housing 31 a two-component developer containing magnetic carrier and toner made of colored particles. The developing device 24 causes the two-component developer to adhere to a developing roller 32, and applies a developing bias from a developing bias power supply 25 to the developing roller 32 to develop the electrostatic latent image with the toner, which is charged to negative polarity, for example. Thereby, the toner image is formed on the photoconductor 21.

Further, the transfer roller 26, which is disposed in contact with the photoconductor 21, for example, is applied with a transfer bias by a transfer bias power supply 27 in a direction of attracting the toner image on the photoconductor 21, to thereby transfer the toner image on the photoconductor 21 onto the recording medium 28.

Toner remaining on the photoconductor 21 without being transferred to the recording medium 28 is removed from the photoconductor 21 by the cleaning device 29, which employs a doctor blade system, for example. Further, the fixing device 50 includes a heating roller 51 and a pressure roller 52. The fixing device 50 transports the recording medium 28 while nipping the recording medium 28 in a gap between the heating roller 51 and the pressure roller 52, to thereby fix the toner image on the recording medium 28.

The above-described image forming operation is controlled by a controller 30. The controller 30 is connected to a receiving unit 40. Via the receiving unit 40, the controller 30 receives various information related to the image forming operation, an instruction to the image forming apparatus 10 from a user of the image forming apparatus 10, image data of the image to be formed by the image forming apparatus 10, and so forth.

FIG. 1 illustrates an example of the image forming apparatus 10 that directly forms the image on the recording medium 28 from the photoconductor 21. However, the image forming system is not limited thereto. For example, a so-called intermediate transfer system may be employed in which the toner image formed on the photoconductor 21 is temporarily transferred to an intermediate transfer belt and then is transferred to the recording medium 28.

The charging device 22, the photoconductor 21, the writing head 23, the developing device 24, the developing bias power supply 25, the transfer roller 26, the transfer bias power supply 27, and the cleaning device 29 are component elements of an image forming unit 20 that forms the image on the recording medium 28. The image forming unit 20 is an example of an image forming unit.

Further, the image forming apparatus 10 may include respective image forming units 20 that form toner images in yellow, magenta, cyan, and black, which are called process colors, to form a color image.

A schematic configuration of the writing head 23 will now be described with reference to FIGS. 2 to 4.

Figure 2:
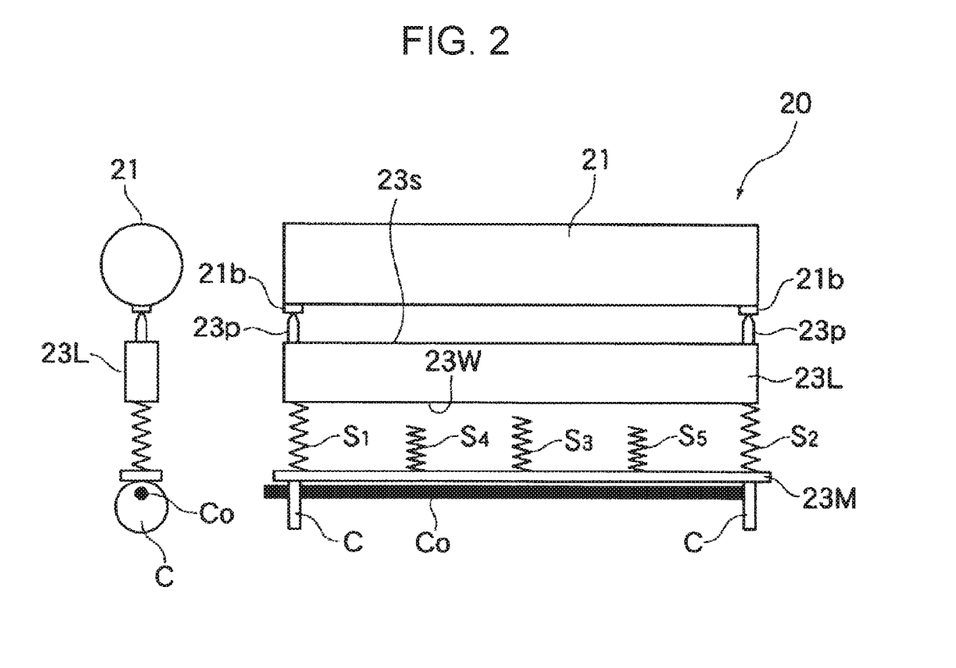
FIG. 2 is a diagram illustrating an example of a writing head with a movable support member separated from a reference position with respect to an LED print head.
Figure 3:
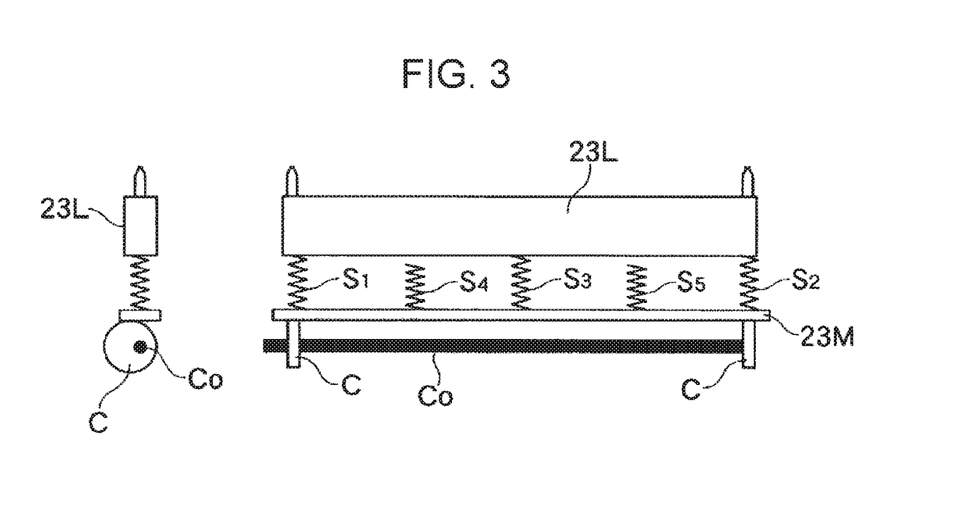
FIG. 3 is a diagram illustrating an example of the writing head with the movable support member located at the reference position.
Figure 4:
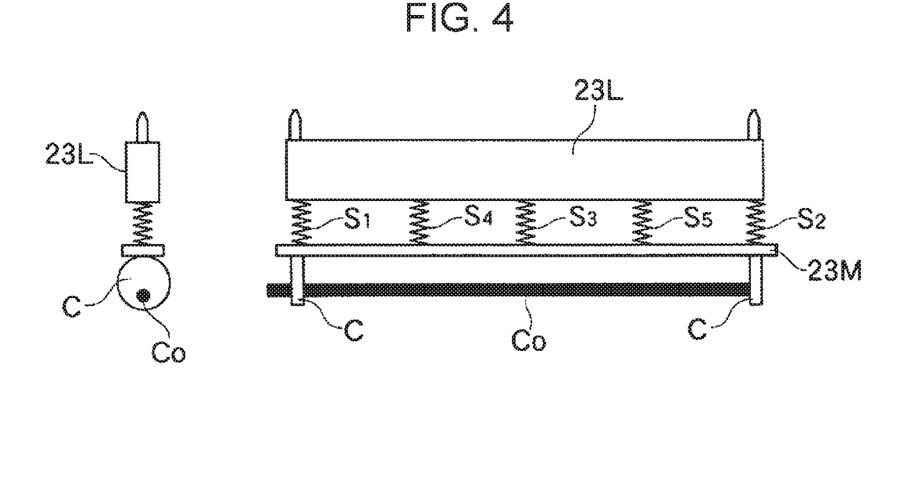
FIG. 4 is a diagram illustrating an example of the writing head with the movable support member moved toward the LED print head from the reference position.

FIGS. 2 to 4 are diagrams schematically illustrating examples of the positional relationship between an LED print head 23L and a movable support member 23M included in the writing head 23.

In these drawings, FIG. 2 is a diagram illustrating a state in which the movable support member 23M is separated (lowered) from a reference position with respect to the LED print head 23L. FIG. 3 is a diagram illustrating a state in which the movable support member 23M is located at the reference position. FIG. 4 is a diagram illustrating a state in which the movable support member 23M is moved (raised) toward the LED print head 23L from the reference position.

In FIGS. 3 and 4, the photoconductor 21 in FIG. 2 is omitted for the convenience of illustration, but is present at the same position as that in FIG. 2.

As illustrated in FIG. 2, the photoconductor 21, which has positioning base members 21b formed in non-image areas on opposite end portions of the photoconductor 21 in the axial direction thereof, is disposed with the LED print head 23L facing the photoconductor 21 and extending substantially parallel to the axial direction of the photoconductor 21. Further, on the opposite side of the photoconductor 21 across the LED print head 23L, the movable support member 23M is disposed which extends in the axial direction and is formed to support the LED print head 23L via plural elastic members S (springs $S_1$ to $S_5$, for example) and be movable in a direction substantially perpendicular to the longitudinal direction of the LED print head 23L (the vertical direction in FIG. 2).

The LED print head 23L includes a substantially box-shaped housing, and has a facing surface 23s facing the photoconductor 21 and having a not-illustrated LED array disposed thereon. In areas of the LED print head 23L corresponding to the positioning base members 21b of the photoconductor 21, positioning contact pins 23p contacting the positioning base members 21b are disposed on opposite ends portions of the LED print head 23L in the axial direction.

Further, the movable support member 23M is a plate-shaped member disposed to face a surface 23w of the LED print head 23L opposite to the facing surface 23s of the LED print head 23L on the side of the photoconductor 21. The movable support member 23M and the LED print head 23L are connected to each other at the opposite end portions thereof in the axial direction by the springs $S_1$ and $S_2$, which have the same spring constant and the same total length. Further, the LED print head 23L is installed to be pressed against the photoconductor 21 by the springs $S_1$ and $S_2$. Further, the springs $S_3$ to $S_5$, for example, are installed between the springs $S_1$ and $S_2$ along the axial direction. The number of springs attached to the movable support member 23M is illustrative, and may be more or less than five.

The springs $S_3$ to $S_5$ have different total lengths from the total length of the springs $S_1$ and $S_2$, for example. If the respective total lengths of the springs $S_1$ to $S_5$ are represented as $L_1$ to $L_5$, plural springs having a relationship $L_1=L_2>L_3>L_4=L_5$ are installed. The lengths of the springs $S_1$ to $S_5$ are illustrative, and the springs $S_1$ to $S_5$ to be used may have any length.

Further, a bottom surface of the movable support member 23M contacts cam members C having an eccentric shaft $C_0$. A not-illustrated drive lever provided to the cam members C is driven to rotate by a not-illustrated motor to move the movable support member 23M toward or away from the LED print head 23L.

The cam members C may be configured to be manually driven by the user of the image forming apparatus 10 with a not-illustrated drive lever.

The cam members C are thus driven to change the number of springs contacting the LED print head 23L and the pressing force applied on the LED print head 23L by the springs $S_1$ to $S_5$, causing a change in the natural frequency of the writing head 23.

The following description will be given of the image forming apparatus 10 that measures the natural frequency of the writing head 23, and drives the cam members C to make the natural frequency of the writing head 23 different from the frequency transmitted to the writing head 23 by the image forming operation of the image forming apparatus 10.

Figure 5:
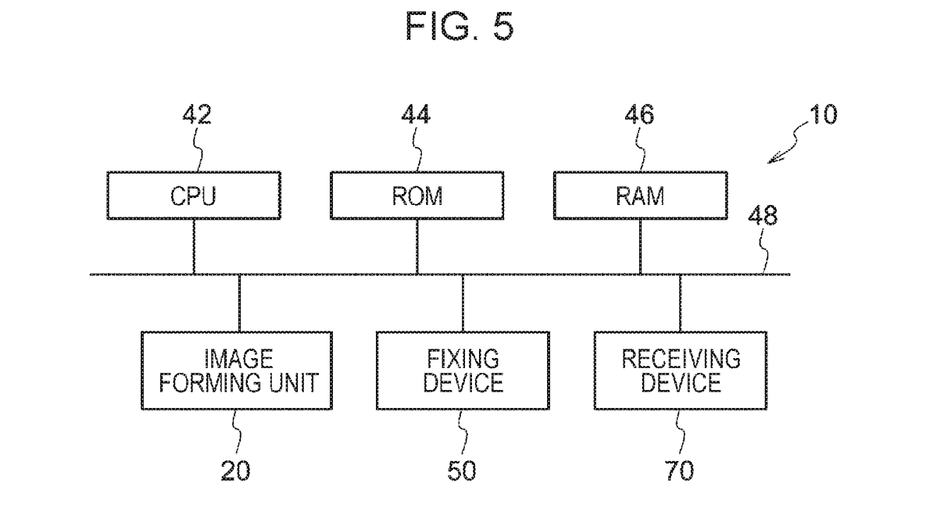
FIG. 5 is a diagram illustrating a configuration example of major parts of an electrical system of the image forming apparatus.

FIG. 5 is a diagram illustrating a configuration example of major parts of an electrical system of the image forming apparatus 10.

In the image forming apparatus 10, the controller 30 that controls the image forming operation of the image forming apparatus 10 includes a central processing unit (CPU) 42. The image forming apparatus 10 further includes a read only memory (ROM) 44 that previously stores various programs, various parameters, and so forth, and a random access memory (RAM) 46 that is used as a work area in the execution of the various programs by the CPU 42.

The CPU 42, the ROM 44, and the RAM 46 are connected to one another by a bus 48 of the image forming apparatus 10. Further, the bus 48 is connected to the image forming unit 20, the fixing device 50, and a receiving device 70 serving as the receiving unit 40.

Members and so forth connected to the bus 48 are not limited to the above-described members. For example, the bus 48 may be connected to a not-illustrated thermometer that detects the internal temperature of the image forming apparatus 10, a communication device connected to a not-illustrated communication line, and an output device, such as a liquid crystal display, which notifies the user of the operating state of the image forming apparatus 10 and so forth.

The controller 30 of the image forming apparatus 10 is thus implemented as a computer including the CPU 42, the ROM 44, and the RAM 46.

Figure 6:
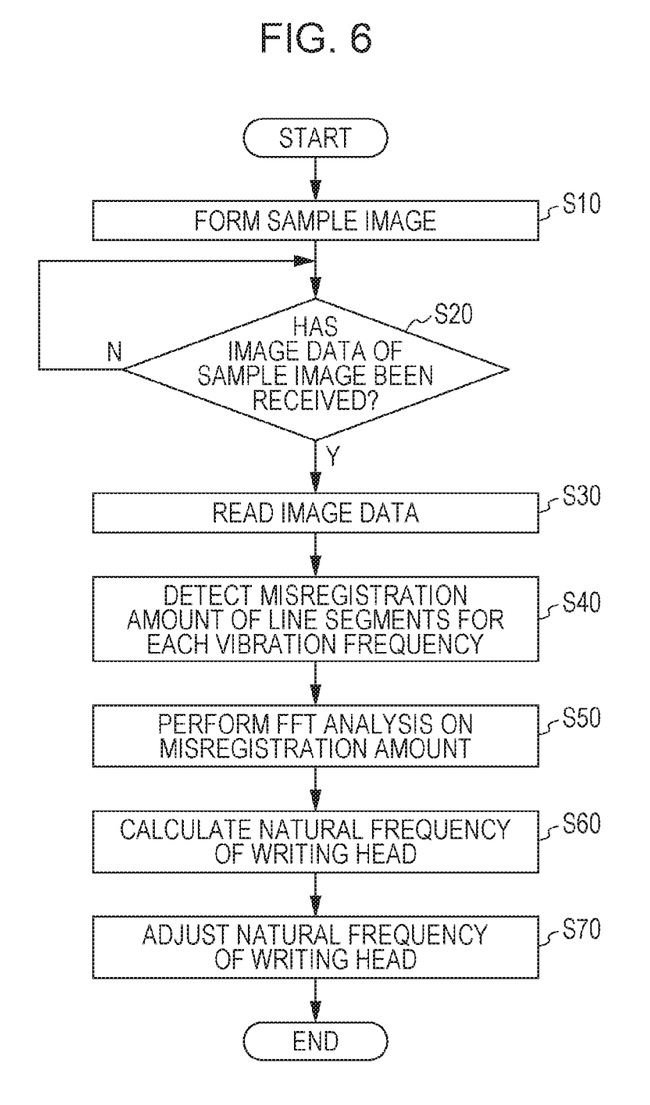
FIG. 6 is a flowchart illustrating an example of the procedure of a natural frequency measuring process.

With reference to FIG. 6, an operation of the image forming apparatus 10 will now be described. FIG. 6 is a flowchart illustrating an example of the procedure of a natural frequency measuring process executed by the CPU 42 before the CPU 42 starts the image forming process. A natural frequency measuring program for executing the natural frequency measuring process is previously stored in the ROM 44, for example.

At step S10, the controller 30 first controls the image forming unit 20 to form on the recording medium 28 a sample image 60 that is used to measure the natural frequency of the writing head 23.

Figure 7:
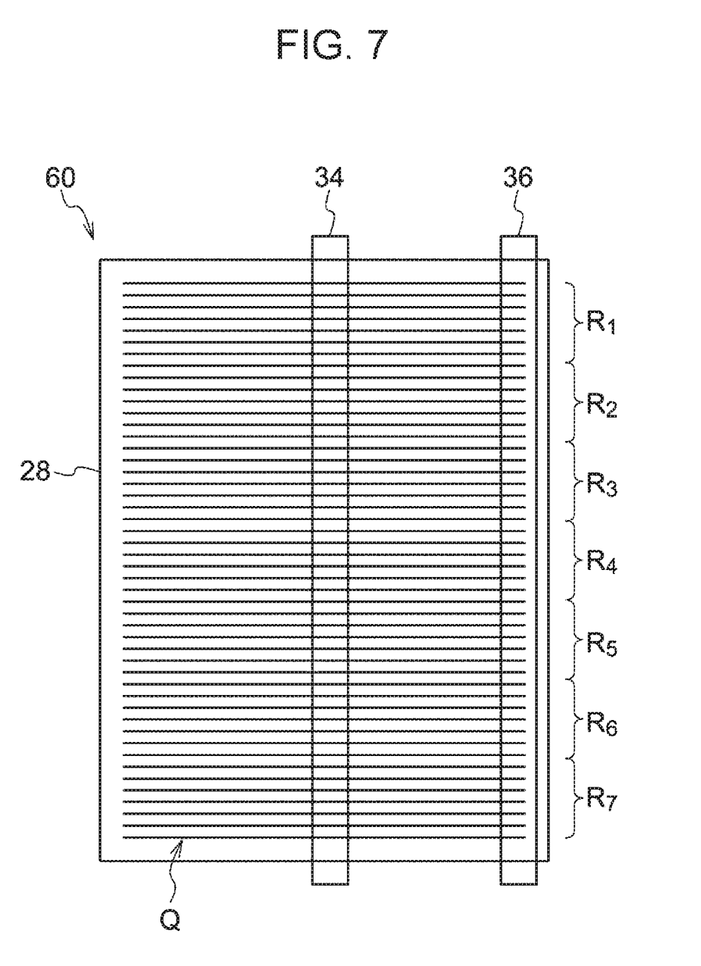
FIG. 7 is a diagram illustrating an example of a sample image.

FIG. 7 is a diagram illustrating an example of the sample image 60 formed at step S10. As illustrated in FIG. 7, the sample image 60 is an image including plural line segments Q formed along the longitudinal direction of the writing head 23, that is, the longitudinal direction of the LED print head 23L. Such an image with the plural line segments Q arranged in a predetermined direction may be referred to as a ladder pattern.

To sequentially provide vibrations of different frequencies to the writing head 23 during the formation of the sample image 60, the controller 30 changes the speed of a not-illustrated motor that drives a member such as the developing roller 32 or the heating roller 51 or the pressure roller 52 of the fixing device 50, to thereby change the frequency of vibration generated on a drive force transmitting path, such as meshing vibration resulting from meshing of gears.

With the speed of the motor thus controlled by the controller 30, the sample image 60 is obtained which includes the line segments Q formed with the vibrations of different frequencies provided to the writing head 23.

In the example of FIG. 7, the sample image 60 includes the line segments Q formed with the vibrations of different frequencies provided for seven areas illustrated as areas $R_1$ to $R_7$.

Specifically, the area $R_1$ includes line segments Q formed with vibration of a frequency $f_1$, and the area $R_2$ includes line segments Q formed with vibration of a frequency $f_2$. Further, the area $R_3$ includes line segments Q formed with vibration of a frequency $f_3$, and the area $R_4$ includes line segments Q formed with vibration of a frequency $f_4$. Further, the area $R_5$ includes line segments Q formed with vibration of a frequency $f_5$, the area $R_6$ includes line segments Q formed with vibration of a frequency $f_6$, and the area $R_7$ includes line segments Q formed with vibration of a frequency $f_7$.

The frequencies $f_1$ to $f_7$ are not required to be predetermined frequencies, and may be any frequencies different from one another. Further, as a source for generating vibration, a vibrating device that generates vibrations of different frequencies may be installed to the image forming apparatus 10. However, generating the vibrations through the control of the speed of the existing motor used in the image forming operation saves the space for installing the vibrating device, thereby facilitating a reduction in size of the image forming apparatus 10. Further, the need for the vibrating device is obviated, thereby reducing the product cost of the image forming apparatus 10.

The motor thus included in the image forming apparatus 10 is an example of a vibrating unit that provides vibration to the writing head 23. The frequency of the vibration provided to the writing head 23 will be referred to as the "vibration frequency."

Further, it is known that the rigidity of a member such as the writing head 23 fluctuates with a change in temperature. For example, the rigidity of the writing head 23 increases with a reduction in temperature, and the natural frequency of the writing head 23 also tends to increase accordingly.

Therefore, the controller 30 may acquire temperature information from a not-illustrated thermometer that detects the internal temperature of the image forming apparatus 10, and may control the speed of the motor to increase the lower limit value of the frequency range of the vibration to be provided to the writing head 23 in accordance with the reduction in the internal temperature of the image forming apparatus 10.

This is because, if the frequency range of the vibration to be provided to the writing head 23 does not include the natural frequency of the writing head 23, it is more difficult to accurately measure the natural frequency of the writing head 23 from the sample image 60 than when the frequency range includes the natural frequency of the writing head 23.

The user of the image forming apparatus 10 uses an image reading apparatus, such as a scanner, which converts the information of an optically read image into data, to read the sample image 60 formed at step S10.

A read sensor that reads the sample image 60 formed on the photoconductor 21 may be installed at a position facing the photoconductor 21 of the image forming apparatus 10 to read the sample image 60 with the read sensor. In this case, the sample image 60 is not formed on the recording medium 28, thereby saving the recording medium 28.

As in the image forming apparatus 10 according to the disclosed technique, however, forming the sample image 60 on the recording medium 28 and reading the sample image 60 with the image reading apparatus different from the image forming apparatus 10 facilitates a reduction in size and cost of the image forming apparatus 10, similarly as in the case of installation of the vibrating device. Further, forming the sample image 60 on the recording medium 28 makes it easy for the user of the image forming apparatus 10 to visually check the sample image 60, and thus to check the quality of the formed image, such as the presence or absence of an image formation failure in the image forming apparatus 10.

The image data of the sample image 60 read by the image reading apparatus is received by the receiving device 70 via a communication line or a portable storage medium, such as a universal serial bus (USB) memory or a memory card, for example. That is, the receiving device 70 is an example of a receiving unit.

At step S20, the controller 30 determines whether or not the receiving device 70 has received the image data of the sample image 60. If a negative determination is made, the controller 30 executes the process of step S20 until the receiving device 70 receives the image data of the sample image 60, to thereby check the receipt of the image data. Meanwhile, if a positive determination is made in the determination process of step S20, the controller 30 proceeds to step S30.

At step S30, the controller 30 reads the image data of the sample image 60 received at step S20, and stores the image data in a predetermined area of the RAM 46, for example.

At step S40, the controller 30 refers to the image data of the sample image 60 stored in the RAM 46 at step S30, and detects a misregistration amount H of the line segments Q for each vibration frequency.

Figure 8:
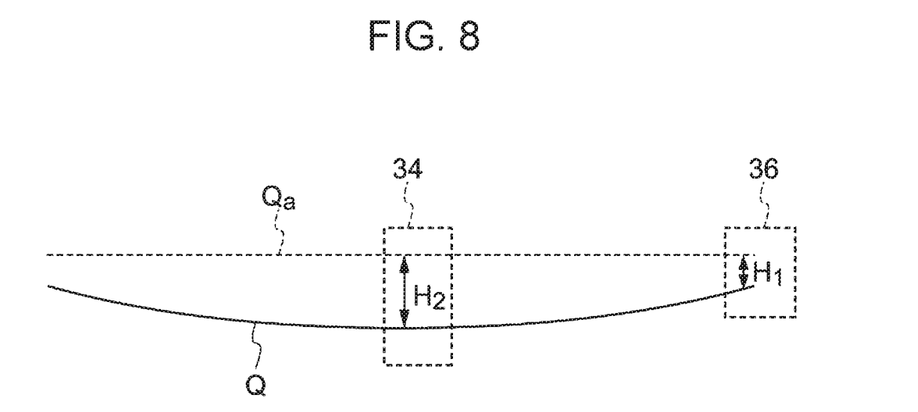
FIG. 8 is a diagram illustrating an example of calculation of a misregistration amount.

FIG. 8 is a diagram illustrating a method of detecting the misregistration amount H of the line segments Q in a specific area $R_n$ (n represents one of integers 1 to 7). As illustrated in FIG. 8, the controller 30 refers to the image data of the sample image 60, and calculates, for each area $R_n$, the difference between a reference line segment $Q_a$ and each of the line segments Q at an end portion 36 and the difference between the reference line segment $Q_a$ and each of the line segments Q at a central portion 34. The reference line segment $Q_a$ is a virtual line segment formed on the recording medium 28 if no vibration is provided to the writing head 23.

Hereinafter, the difference between the reference line segment $Q_a$ and the line segment Q at the end portion 36 will be referred to as the misregistration amount $H_1$, and the difference between the reference line segment $Q_a$ and the line segment Q at the central portion 34 will be referred to as the misregistration amount $H_2$. Further, if there is no need to describe the misregistration amounts $H_1$ and $H_2$ distinctively from each other, the misregistration amounts $H_1$ and $H_2$ will collectively be referred to as the misregistration amounts H.

The position of the reference line segment $Q_a$ is previously obtained through an experiment with an actual model of the image forming apparatus 10 or computer simulation based on design specifications of the image forming apparatus 10, and is previously stored in the ROM 44, for example. Further, it is needless to say that the misregistration amount $H_1$ may be calculated at an end portion on the other side of the line segment Q instead of the end portion 36 on one side of the line segment Q.

Further, if one area $R_n$ includes plural line segments Q, one of summary statistics such as the mean value, the maximum value, and the minimum value of the misregistration amounts $H_1$ or $H_2$ of the line segments Q may be determined as the misregistration amount $H_1$ or $H_2$ of the line segments Q in the area $R_n$.

The controller 30 controls the image forming unit 20 to form a determined number of line segments Q in one area $R_n$ of the sample image 60, for example. Therefore, which area $R_n$ includes which one of the line segments Q is clear.

At step S50, the controller 30 performs fast Fourier transform (FFT) on the misregistration amount H of the line segments Q detected at step S40, and calculates a frequency characteristic of the misregistration amount H obtained when the vibration frequency is applied to the writing head 23.

Figure 9:
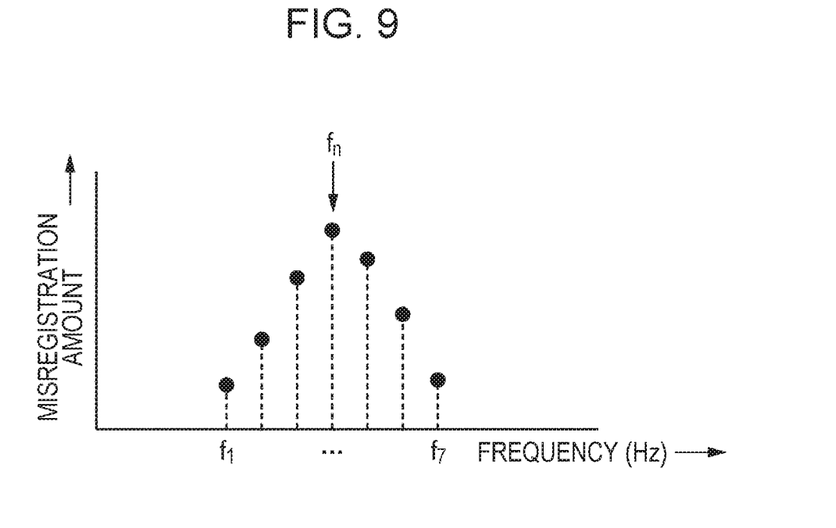
FIG. 9 is a graph illustrating an example of a frequency characteristic of the misregistration amount.

FIG. 9 is a graph illustrating an example of the frequency characteristic of the misregistration amount $H_2$ calculated at step S50, for example. In FIG. 9, the horizontal axis represents the frequency, and the vertical axis represents the misregistration amount H. The frequency characteristic of the misregistration amount $H_1$ is also expressed in the same form as that in FIG. 9.

Figure 10:
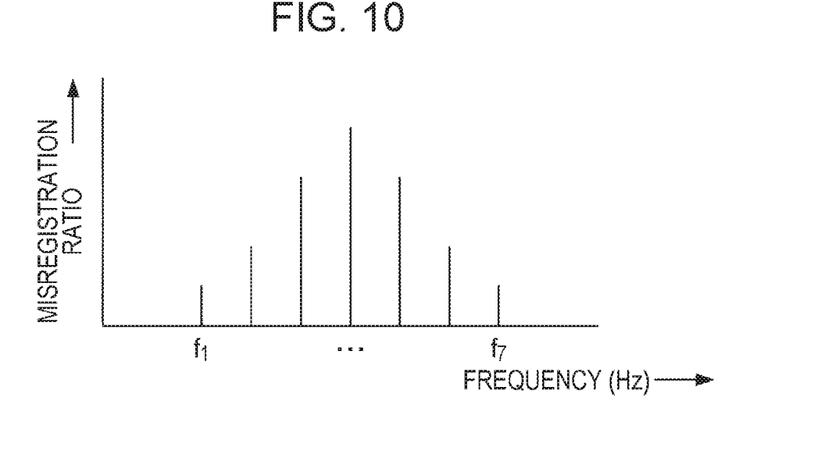
FIG. 10 is a graph illustrating an example of a frequency response characteristic of a misregistration ratio.

At step S60, with the respective frequency characteristics of the misregistration amounts $H_1$ and $H_2$ calculated at step S50, the controller 30 calculates, for each of the frequencies, the ratio of the misregistration amount $H_2$ at the central portion 34 to the misregistration amount $H_1$ at the end portion 36, that is, a misregistration ratio ($H_2/H_1$), to thereby calculate a frequency response characteristic as illustrated in FIG. 10. In FIG. 10, the horizontal axis represents the frequency, and the vertical axis represents the misregistration ratio ($H_2/H_1$).

Then, the controller 30 measures the frequency maximizing the misregistration ratio as the natural frequency of the writing head 23. As the misregistration ratio, $H_1/H_2$ may be used. In this case, the controller 30 measures the frequency minimizing the misregistration ratio as the natural frequency of the writing head 23.

If a vibration frequency close to the natural frequency of the writing head 23 is provided to the writing head 23, and if a central portion of the LED print head 23L is not supported by the spring $S_3$, as illustrated in FIG. 2, for example, the misregistration amount $H_2$ at the central portion 34 of the line segment Q is considered to be maximized. Meanwhile, the change in the misregistration amount $H_1$ at the end portion 36 of the line segment Q may tend to be smaller than the change in the misregistration amount $H_2$, even if the vibration frequency is changed.

Therefore, the controller 30 may determine the natural frequency not as the misregistration ratio but as the frequency maximizing the misregistration amount $H_2$, for example.

With the respective processes of steps S10 to S60, the controller 30 measures the natural frequency of the writing head 23. Therefore, the controller 30 is also an example of a measuring unit that measures the natural frequency of a member.

At step S70, the controller 30 controls the rotation amount of the motor that rotates the not-illustrated drive lever provided to the cam members C to make the natural frequency of the writing head 23 calculated at step S60 equal to a designed natural frequency of the writing head 23, to thereby adjust the position of the movable support member 23M that supports the LED print head 23L.

In consideration of characteristics of the source and the transmission path of the vibration generated in the image forming operation, the natural frequency of the writing head 23 is designed by the developers of the image forming apparatus 10 to minimize the misregistration amount of the writing head 23.

With the natural frequency of the writing head 23 adjusted to the designed natural frequency, therefore, the misregistration of the writing head 23 is reduced to a designed misregistration amount, that is, a minimum misregistration amount.

The correspondence relationship between the rotation amount of the motor that rotates the not-illustrated drive lever and the natural frequency of the writing head 23 is previously obtained through an experiment with an actual model of the image forming apparatus 10 or computer simulation based on the design specifications of the image forming apparatus 10, and is previously stored in the ROM 44, for example.

The method of reducing the misregistration amount H of the writing head 23 is not limited to the above-described method of adjusting the natural frequency of the writing head 23 to the designed natural frequency.

For example, with the previously acquired frequency characteristic of the misregistration amount H of the writing head 23 in a normal image forming operation of the image forming apparatus 10 (a reference frequency characteristic) and the frequency response characteristic calculated at step S60, the controller 30 may calculate a target frequency response characteristic minimizing the sum of the misregistration amounts H, such as the misregistration amounts $H_2$, for example, for respective frequencies included in a predetermined frequency range. Then, the controller 30 may adjust the natural frequency of the writing head 23 to equal the natural frequency corresponding to the target frequency response characteristic.

Herein, the normal image forming operation refers to an operation of forming an image without the intentional change in the speed of the motor as in step S10 to change the magnitude of the vibration generated on the drive force transmitting path.

It is assumed that the ROM 44 previously stores the reference frequency characteristic of the writing head 23. The reference frequency characteristic of the writing head 23 is previously obtained through an experiment with an actual model of the image forming apparatus 10 or computer simulation based on the design specifications of the image forming apparatus 10, for example.

Figure 11:
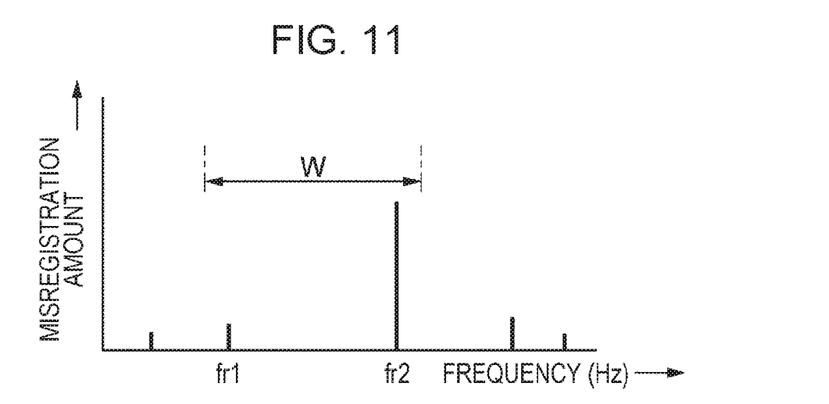
FIG. 11 is a graph illustrating an example of a reference frequency characteristic of the misregistration amount.

FIG. 11 is a graph illustrating an example of the reference frequency characteristic of the writing head 23. In FIG. 11, the horizontal axis represents the frequency, and the vertical axis represents the misregistration amount $H_2$ of the line segments Q, for example. In FIG. 11, the range indicated by "W" represents a resonance frequency range W of the writing head 23.

The misregistration amount $H_2$ of a member included in the image forming apparatus 10, such as the writing head 23, is maximized when vibration having the same frequency as the natural frequency of the member is provided to the member. When the member is provided with vibration having a frequency within a predetermined range including the natural frequency of the member, that is, the resonance frequency range W, the misregistration amount $H_2$ may also be increased to a degree at which the influence of the increase in the misregistration amount $H_2$ on the image quality is not negligible.

Meanwhile, the frequency response characteristic calculated at step S60 represents the degree of response of the vibration of the writing head 23, which has a specific natural frequency, to the respective frequencies.

From the ratio between a misregistration ratio $G_b$ at each of the frequencies in the frequency response characteristic calculated at step S60 and a misregistration ratio $G_c$ at each of the frequencies obtained by adjusting the natural frequency of the frequency response characteristic calculated at step S60 and moving the frequency response characteristic (a response magnification), therefore, the misregistration amount H at each of the frequencies in the resonance frequency range W subjected to the adjustment of the natural frequency is obtained.

Figure 12:
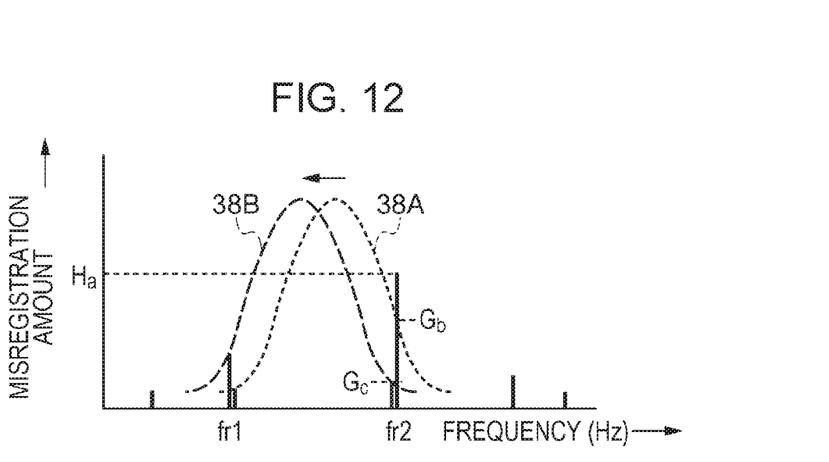
FIG. 12 is a schematic graph for use in illustrating an example of adjustment of a natural frequency.

FIG. 12 is a graph illustrating the reference frequency characteristic of the writing head 23 illustrated in FIG. 11 and an example of the frequency response characteristic of the writing head 23 calculated at step S60 (a calculated frequency response characteristic 38A).

Herein, $H_a$ represents the misregistration amount at a frequency fr2 represented by the reference frequency characteristic. Further, $G_b$ represents the misregistration ratio at the frequency fr2 represented by the calculated frequency response characteristic 38A. Further, $G_0$ represents the misregistration ratio at the frequency fr2 in a moved frequency response characteristic 38B, which represents a calculated frequency response characteristic obtained by moving the calculated frequency response characteristic 38A to the left in FIG. 12 along the horizontal axis.

In this case, the response magnification of the misregistration ratio at the frequency fr2 is ($G_c/G_b$). Therefore, the misregistration amount H at the frequency fr2 obtained after moving the calculated frequency response characteristic 38A to the moved frequency response characteristic 38B is represented as ($H_a \cdot G_c/G_b$), wherein "." is an arithmetic symbol indicating multiplication.

The controller 30 may sequentially move the calculated frequency response characteristic 38A to the left and the right in FIG. 12, as described above. Each time the calculated frequency response characteristic 38A is moved, the controller 30 may calculate the misregistration amount H at each of the frequencies based on the response magnification at each of the frequencies included in the resonance frequency range W. Then, the controller 30 may acquire, as the target frequency response characteristic, the moved frequency response characteristic 38B minimizing the sum of the misregistration amounts H at the respective frequencies included in the resonance frequency range W. Then, the controller 30 may calculate, as the natural frequency, the frequency maximizing the misregistration amount H in the target frequency response characteristic, and may control the rotation amount of the motor that rotates the not-illustrated drive lever provided to the cam members C of the writing head 23 to make the natural frequency of the writing head 23 equal to the natural frequency represented by the target frequency response characteristic.

As described above, the image forming apparatus 10 according to the disclosed technique reads the sample image 60 including the plural line segments Q formed with the vibrations of different frequencies sequentially provided to the writing head 23, and detects the misregistration amount H of the line segments Q for each of the vibration frequencies. The image forming apparatus 10 then calculates the natural frequency of the writing head 23 from the frequency response characteristic of the misregistration amount H, and adjusts the natural frequency of the writing head 23 to minimize the misregistration amount H of the writing head 23.

Accordingly, the natural frequency of the writing head 23 is measured more accurately than when the natural frequency of the writing head 23 is set to a previously obtained fixed value.

In the exemplary embodiment, the measurement and adjustment of the natural frequency has been described with reference to the writing head 23 as an example. However, it is needless to say that the natural frequency measurement process and the natural frequency adjustment process are also applicable to a member other than the writing head 23.

Further, in the exemplary embodiment, the natural frequency measuring process of the controller 30 implemented by software has been described as an example. However, for example, a process similar to that of the flowchart illustrated in FIG. 6 may be performed by hardware. In this case, the processing speed is higher than when the process of the controller 30 is implemented by software.

Further, in the exemplary embodiment, the natural frequency measuring program installed in the ROM 44 has been described. However, the configuration is not limited thereto. The natural frequency measuring program according to the disclosed technique may be provided as recorded on a computer-readable storage medium. For example, the natural frequency measuring program according to the disclosed technique may be provided as recorded on an optical disc, such as a compact disc (CD)-ROM or a digital versatile disc (DVD)-ROM, or on a portable storage medium, such as a USB memory or a memory card. Further, the natural frequency measuring program according to the disclosed technique may be provided as recorded on a semiconductor memory, such as a flash memory. Further, if the image forming apparatus 10 is connected to a communication line, the natural frequency measuring program according to the disclosed technique may be provided via the communication line.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. For example, the order of the processes may be changed within a scope not departing from the gist of the disclosed technique. It is intended that the scope of the invention be defined by the following claims and their equivalents.

What is claimed is:

1. A natural frequency measuring device comprising:
a receiving unit configured to receive information read from an image formed on a recording medium,
wherein the image was formed with vibrations of different frequencies being provided to a member used to form the image; and
a measuring unit configured to measure a natural frequency of the member from a frequency response characteristic using a misregistration amount of the image represented by the information of the image received by the receiving unit,
wherein the image includes a plurality of line segments formed along a longitudinal direction of the member, and
wherein the measuring unit is configured to measure the natural frequency of the member from the frequency response characteristic representing a ratio between a misregistration amount at an end portion of each of the line segments along the longitudinal direction of the member and a misregistration amount at a central portion of each of the line segments along the longitudinal direction of the member.

2. The natural frequency measuring device according to claim 1, wherein the measuring unit is configured to determine the natural frequency of the member as a frequency at which the ratio is higher than at any other frequency in the frequency response characteristic.

3. An image forming apparatus comprising:
an image forming unit configured to form an image on a recording medium;
a vibrating unit configured to provide vibration of a set frequency to a member included in the image forming unit;
a natural frequency measuring device comprising:
a receiving unit configured to receive information read from an image formed on a recording medium,
wherein the image was formed with vibrations of different frequencies being provided to a member used to form the image; and
a measuring unit configured to measure a natural frequency of the member from a frequency response characteristic using a misregistration amount of the image represented by the information of the image received by the receiving unit; and
a controller configured to use the frequency response characteristic of the misregistration amount of the image formed on the recording medium by the image forming unit to acquire a target frequency response characteristic reducing a sum of misregistration amounts included in a predetermined frequency range, and to control the natural frequency of the member to approach a natural frequency corresponding to the target frequency response characteristic.

4. The image forming apparatus according to claim 3, wherein the controller is configured to set the frequency of the vibration to be provided to the member to increase the frequency in accordance with a reduction in temperature of the member.

5. An image forming apparatus comprising:
an image forming unit configured to form an image on a recording medium;
a vibrating unit configured to provide vibration of a set frequency to a member included in the image forming unit;
a natural frequency measuring device comprising:
a receiving unit configured to receive information read from an image formed on a recording medium,
wherein the image was formed with vibrations of different frequencies being provided to a member used to form the image; and
a measuring unit configured to measure a natural frequency of the member from a frequency response characteristic using a misregistration amount of the image represented by the information of the image received by the receiving unit; and
a controller configured to set a frequency of vibration to be provided to the member to increase the frequency in accordance with a reduction in temperature of the member.

6. A natural frequency measuring device comprising:
a receiving unit configured to receive information read from an image formed on a recording medium,
wherein the image was formed with vibrations of different frequencies being provided to a member used to form the image; and
a measuring unit configured to measure a natural frequency of the member from a frequency response characteristic using a misregistration amount of the image represented by the information of the image received by the receiving unit,
wherein the image includes a plurality of line segments, and
wherein the measuring unit is configured to measure the natural frequency of the member from the frequency response characteristic representing a ratio between misregistration amounts at different portions of each of the line segments.

* * * * *